US012606428B2

(12) United States Patent
Kreuze et al.

(10) Patent No.: US 12,606,428 B2
(45) Date of Patent: Apr. 21, 2026

(54) CAPPING CHUCK ASSEMBLY FOR A FILLER, A CAPPER AND A FILLER HAVING A CAPPING CHUCK ASSEMBLY

(71) Applicant: Fogg Filler Company, LLC, Holland, MI (US)

(72) Inventors: Kenneth Kreuze, Holland, MI (US); Larry Rillema, Zeeland, MI (US)

(73) Assignee: FOGG FILLER COMPANY, LLC, Holland, MI (US)

( * ) Notice: Subject to any disclaimer, the term of this patent is extended or adjusted under 35 U.S.C. 154(b) by 0 days.

(21) Appl. No.: 18/423,916

(22) Filed: Jan. 26, 2024

(65) Prior Publication Data

US 2024/0253961 A1 Aug. 1, 2024

Related U.S. Application Data

(60) Provisional application No. 63/442,234, filed on Jan. 31, 2023.

(51) Int. Cl.
*B67B 3/20* (2006.01)
*B67B 3/26* (2006.01)

(52) U.S. Cl.
CPC ............ *B67B 3/2066* (2013.01); *B67B 3/265* (2013.01); *B67B 3/2053* (2013.01)

(58) Field of Classification Search
CPC ..... B67B 3/2066; B67B 3/265; B67B 3/2053; B67B 3/20; B67B 3/2073
USPC ................................................ 53/317, 331.5
See application file for complete search history.

(56) References Cited

U.S. PATENT DOCUMENTS

| | | | | |
|---|---|---|---|---|
| 880,406 | A | 2/1908 | Schmidt | |
| 933,057 | A | 9/1909 | Brewington | |
| 1,161,924 | A | 11/1915 | Cassady | |
| 1,319,945 | A | 10/1919 | Buzatt | |
| 1,754,461 | A | 4/1930 | Cundall | |
| 1,773,259 | A | 8/1930 | Cundall | |
| 2,409,899 | A | 10/1946 | Resina | |
| 2,593,794 | A | 4/1952 | Resina | |
| 3,262,247 | A | 7/1966 | Scholle | |
| 3,597,896 | A | 8/1971 | Koll | |
| 3,906,706 | A * | 9/1975 | Conti | B67B 3/2066 53/345 |
| 4,173,104 | A | 11/1979 | Koll | |
| 5,284,001 | A * | 2/1994 | Ochs | B67B 3/268 53/317 |
| 5,467,527 | A | 11/1995 | Zanini | |
| 6,508,046 | B1 | 1/2003 | Resterhouse | |
| 7,322,165 | B2 * | 1/2008 | Spether | B67B 3/2066 53/317 |
| 11,292,705 | B2 | 4/2022 | Rillema | |
| 2014/0311089 | A1 | 10/2014 | Scott | |
| 2019/0177145 | A1 | 6/2019 | Caffa | |

* cited by examiner

*Primary Examiner* — Shelley M Self
*Assistant Examiner* — Xavier A Madison
(74) *Attorney, Agent, or Firm* — THOMPSON HINE LLP

(57) ABSTRACT

A capping apparatus includes a capping chuck assembly having (i) one or more peripheral ejector projections to facilitate ejection of an upside down cap and/or (ii) a single collet style cap gripper with an adjustment assembly to facilitate handling of different cap sizes.

14 Claims, 17 Drawing Sheets

CAPPING CHUCK ASSEMBLY FOR A FILLER, A CAPPER AND A FILLER HAVING A CAPPING CHUCK ASSEMBLY

TECHNICAL FIELD

This application relates in general to bottle and other container capping equipment, and more particularly, to a capping chuck assembly for a filler.

BACKGROUND

The filling and capping of bottles and other containers is known in the art. Among other solutions are threaded bottles that receive caps having mating threads on an inside surface thereof. Typically, these caps are picked up by a capping chuck and applied onto a bottle. For this purpose, capping chucks include a capping chuck assembly with a cap receiving opening, and some form of cap gripper is provided to retain the cap in the cap receiving opening.

In one example, the cap gripper is in the form of a "single collet" that is manufactured to a fixed dimension. A disadvantage of this gripper type is that the tolerances must be very tight and inconsistencies in dimensions as between caps of the "same size" can create problems.

In another example, the cap gripper is in the form of multiple jaws that move to accommodate the cap, such as that described in U.S. Pat. Nos. 6,508,046 and 11,292,705, both of which are incorporated herein by reference.

Regardless of the gripper type, such capping chucks commonly include a cap ejector mechanism that can be actuated to move axially into contact with the top of the cap and push the cap out of the capping chuck, if needed. However, occasionally, such capping chucks engage with a cap that is inverted or upside-down (i.e., with the open end of the cap facing up into the capping chuck). Known ejector mechanisms are unable to effectively eject caps in this orientation, because the ejector mechanism moves axially into the open end of the upside-down cap rather than engaging with the top of the cap. In such cases, the throughput of the filler on which the capping chuck is located is impacted because the capping chuck becomes unusable until the machine is stopped and the inverted cap is manually removed.

Accordingly, it would be desirable to provide a capping chuck assembly that addresses one or more of the above-identified problems.

SUMMARY

In one aspect, a capping apparatus for applying caps to containers includes a capping chuck assembly including: a cap receiving opening with a central axis; a cap gripper configured for holding a cap within the cap receiving opening, the cap gripper defining inwardly facing surface portions configured for cap engagement, wherein the inwardly facing surface portions are located at a first radial distance from the central axis; and a cap ejector axially movable relative to the cap gripper. The cap ejector includes one or more peripheral ejector projections movable between a normal position that is retracted relative to an inlet side of the cap receiving opening and a cap eject position that is shifted toward the inlet side of the cap receiving opening, wherein each of the one or more ejector projections includes a cap engaging surface portion that extends from a location radially inward of the first radial distance to a location radially outward of the first radial distance, such that each of the one or more ejector projections is configured to eject an upside down cap within the cap receiving opening by engaging with a free end of an outer sidewall of the upside down cap.

In another aspect, a capping apparatus for applying caps to containers includes a capping chuck assembly including: a cap receiving opening with a central axis; and a cap gripper configured for holding a cap within the cap receiving opening. The cap gripper includes a collet assembly including: a ring-shaped collet body extending about a periphery of the cap receiving opening, the ring-shaped collet body includes an upper side, a lower side, a radially inner side and a radially outer side, the ring-shaped collet body having a gap extending from the radially inner side to the radially outer side and from the upper side to the lower side to form a full break in continuity of the ring-shaped collet body, wherein the radially inner side of the ring-shaped collet body includes surface portions configured for cap engagement; and an adjustment assembly mounted on the ring-shaped collet body for varying a size of the gap such that a radial spacing of the inner surface portions from the central axis is adjustable to accommodate cap size variations.

The details of one or more embodiments are set forth in the accompanying drawings and the description below. Other features, objects, and advantages will be apparent from the description and drawings, and from the claims.

DETAILED DESCRIPTION

Figure 1:
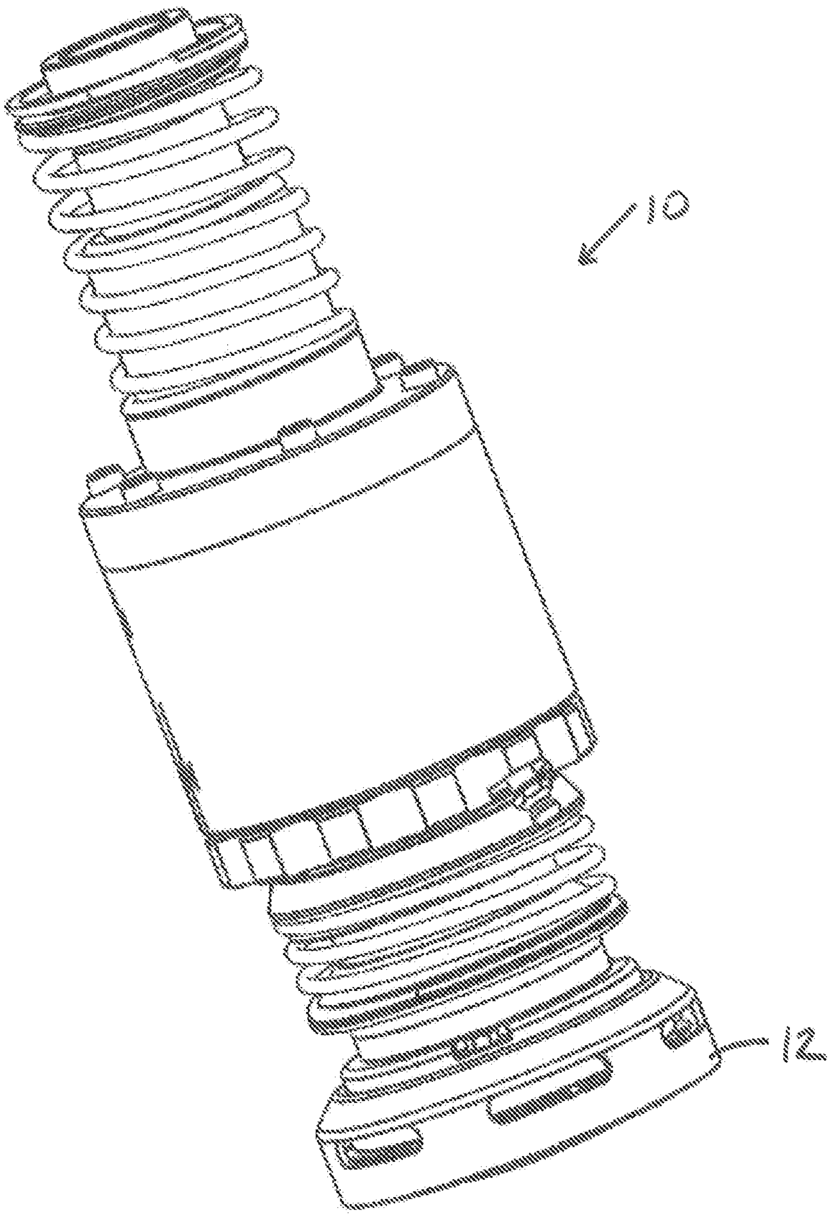
FIG. 1 is a perspective view of one embodiment of a capping chuck assembly.
Figure 2:
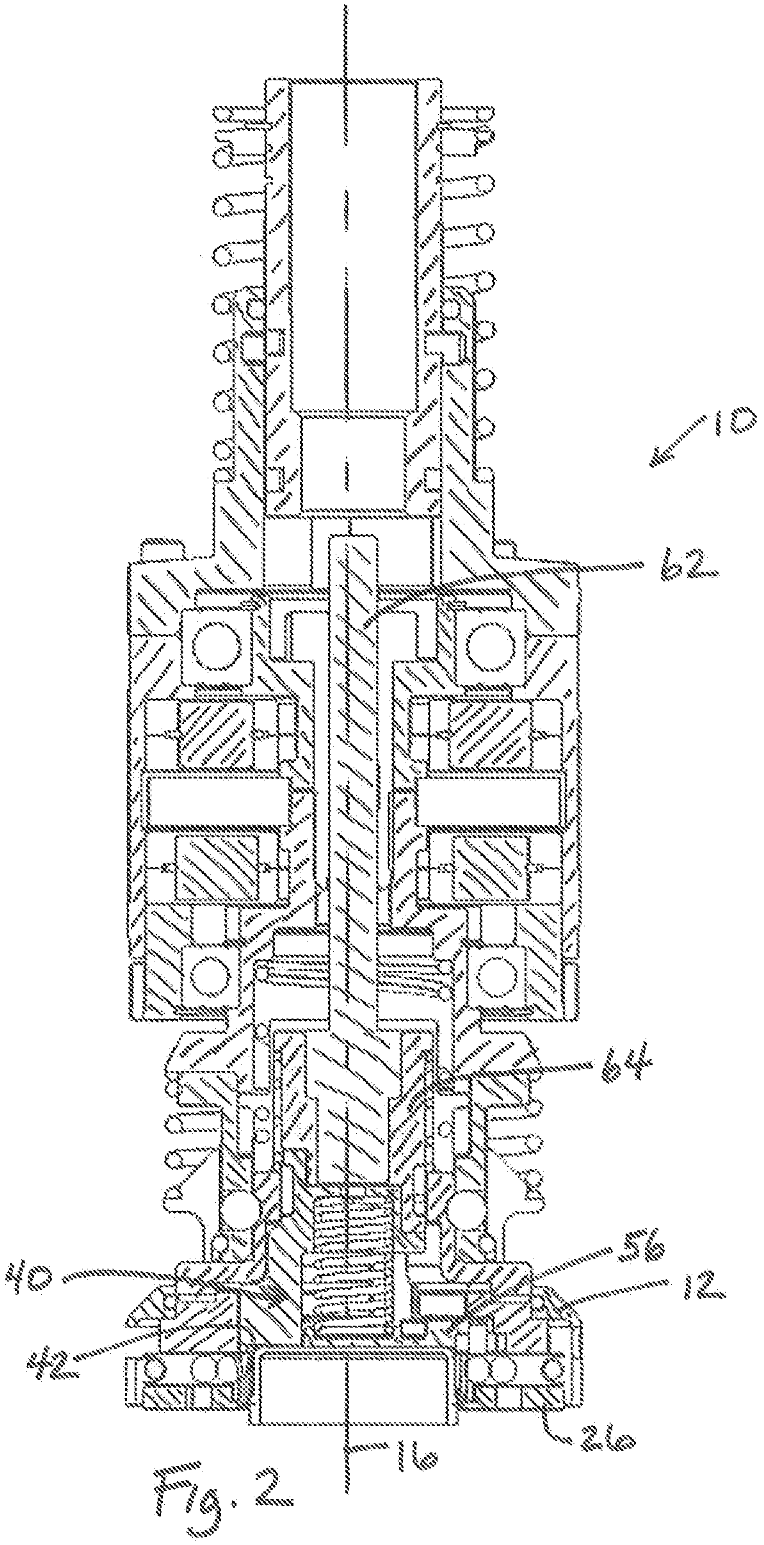
FIG. 2 is a cross-sectional view of the capping chuck assembly.
Figure 4:
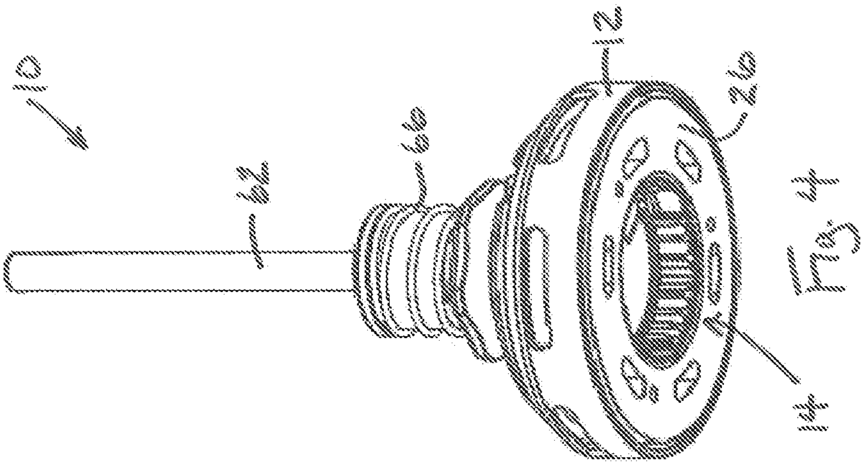
FIGS. 3 and 4 are perspective views of a portion of the capping chuck assembly.
Figure 3:
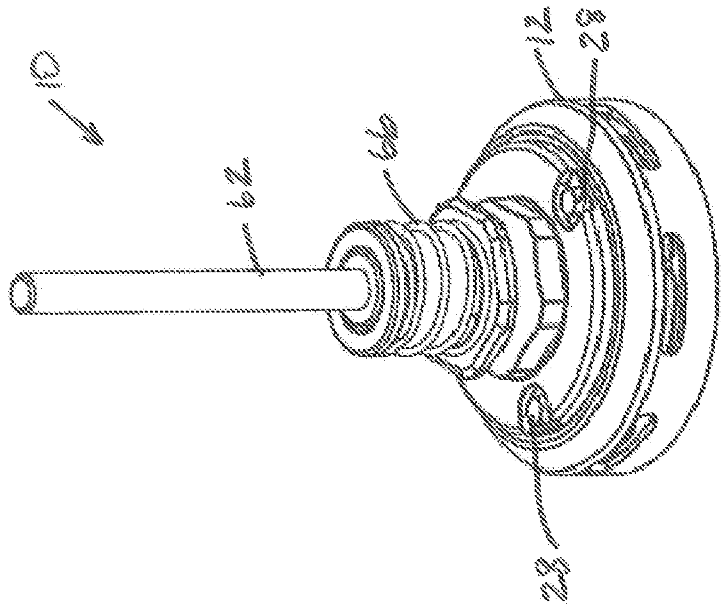
Figure 5:
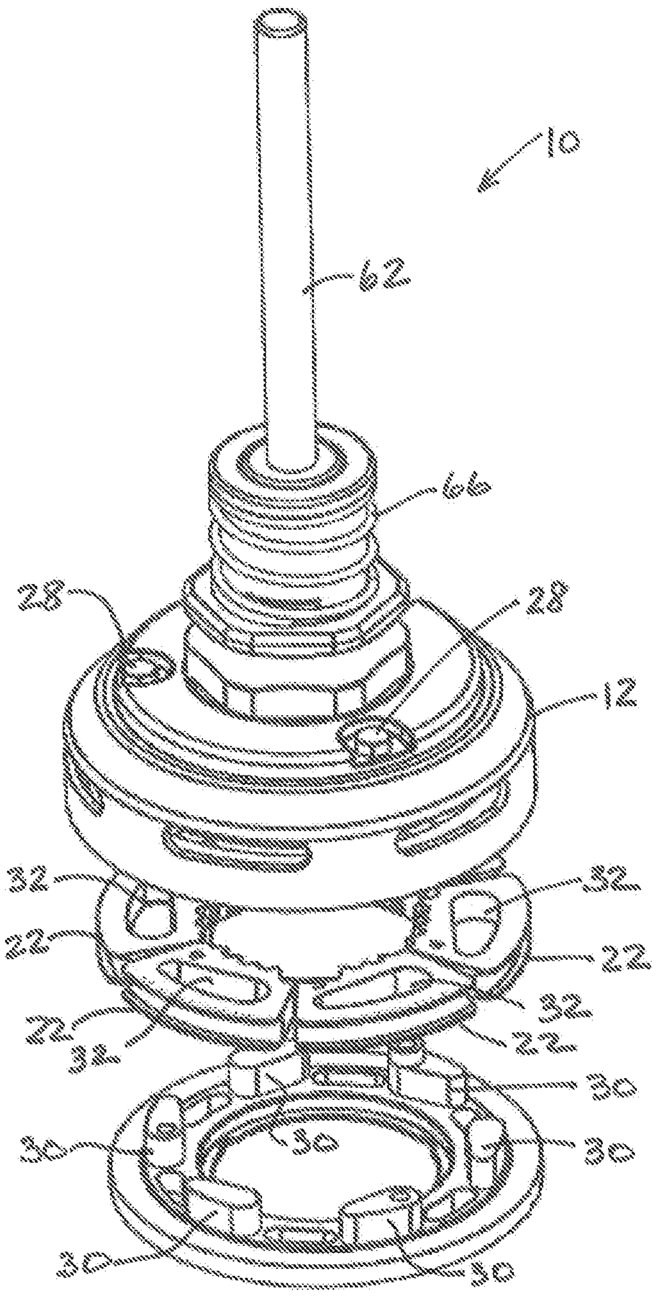
FIG. 5 is and exploded view of the portion of the capping chuck assembly.
Figure 8:
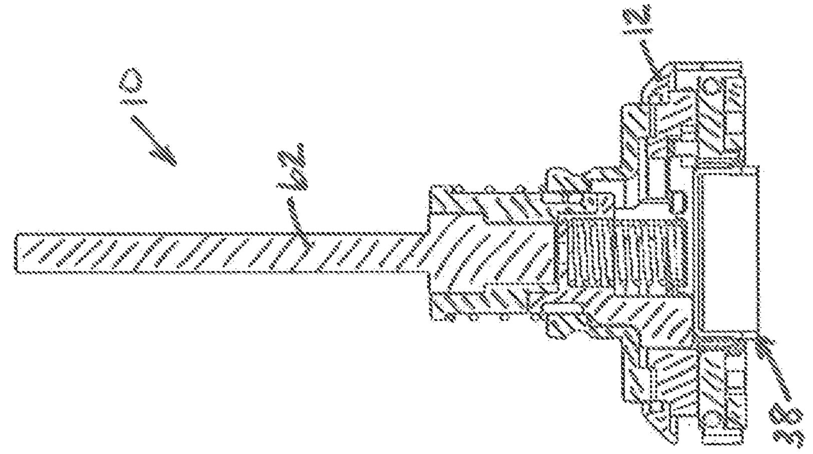
FIGS. 6-9 are cross-sectional views of the portion of the capping chuck assembly.
Figure 7:
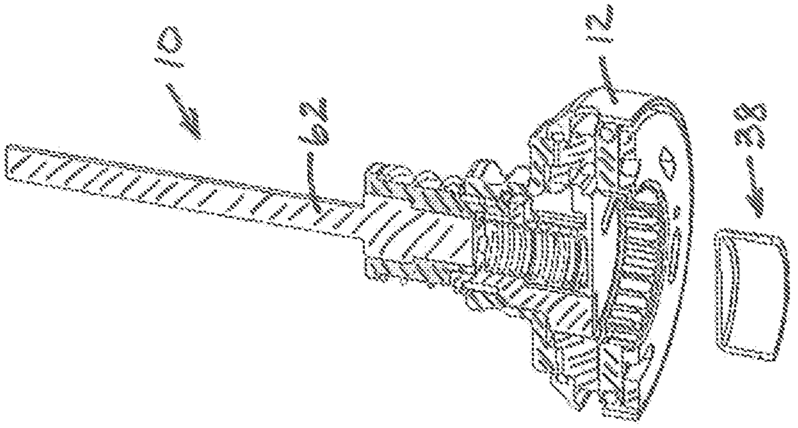
Figure 6:
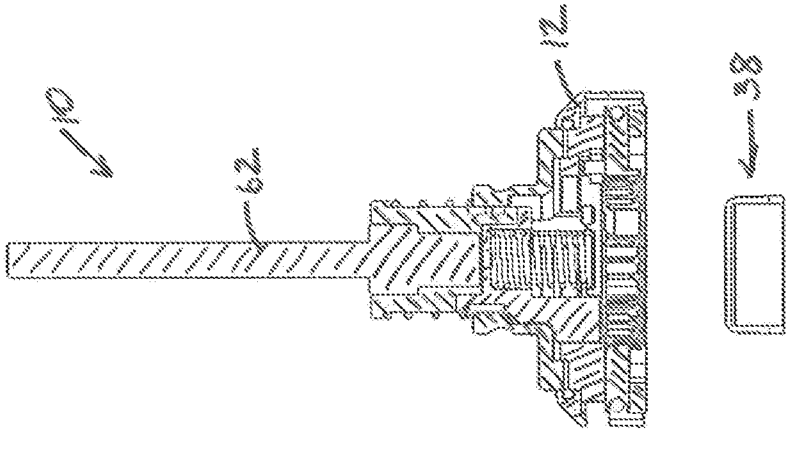
Figure 9:
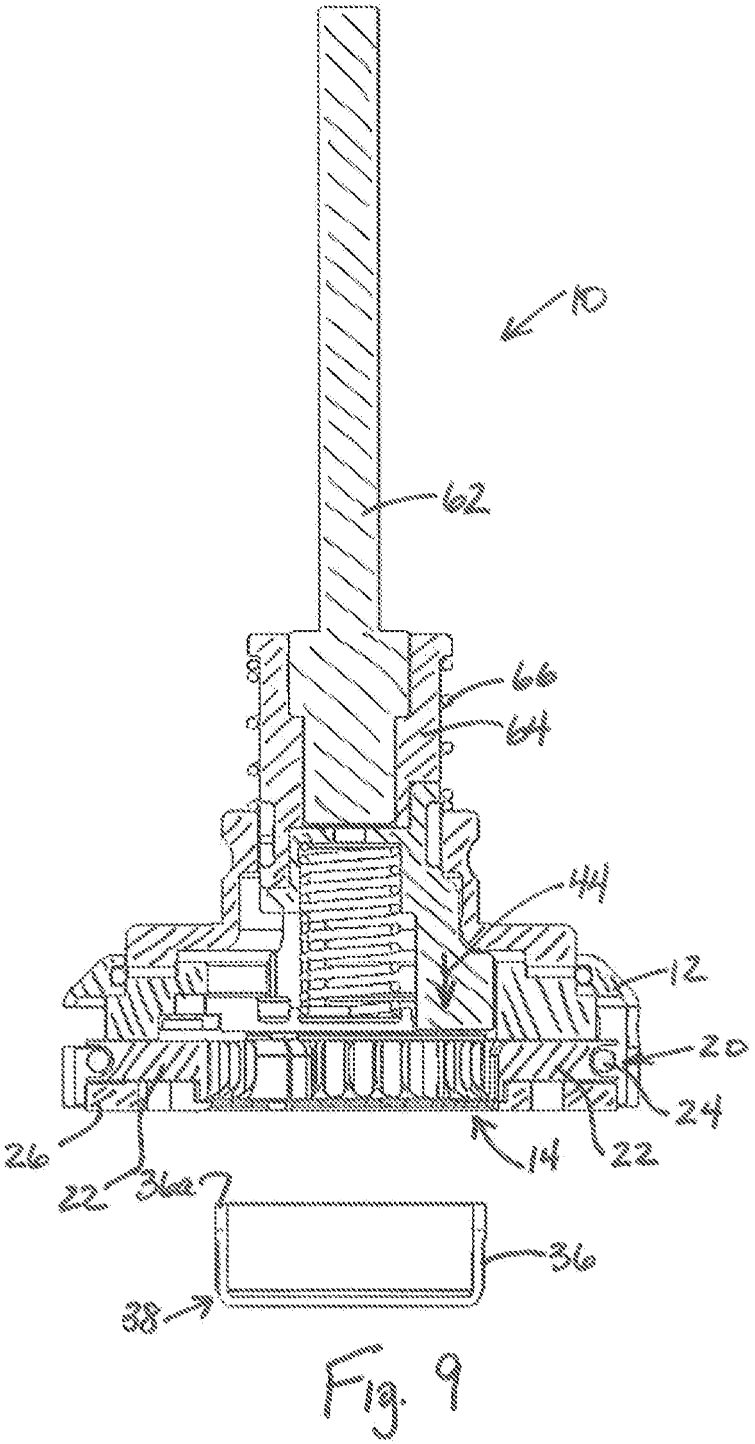
Figure 11:
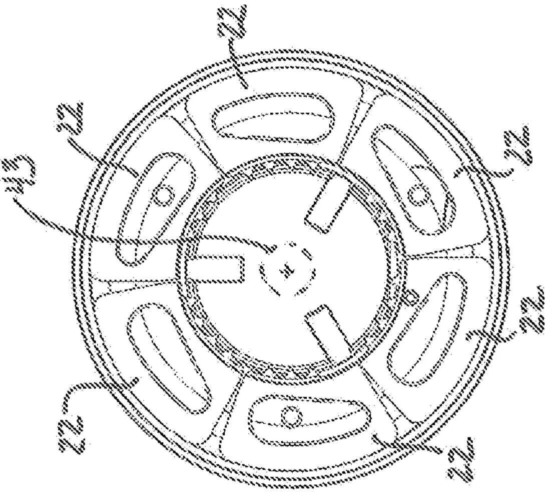
FIGS. 11-12 are bottom partial views of the capping chuck assembly with the lower retaining ring removed.
Figure 12:
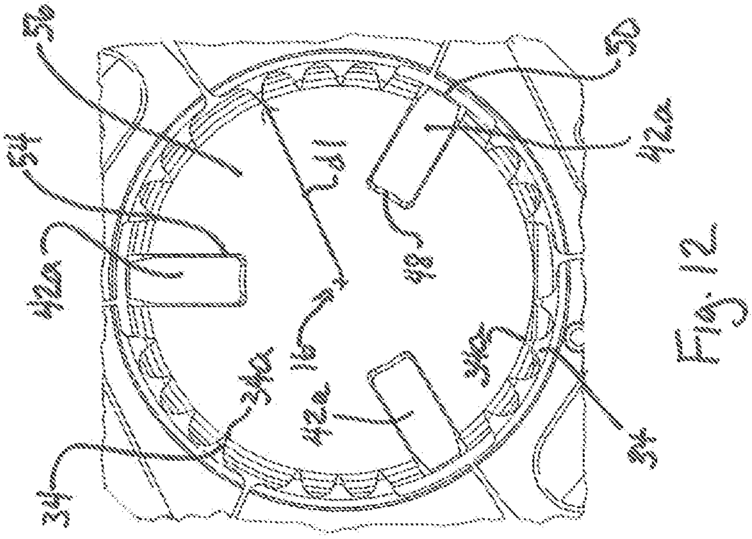
Figure 10:
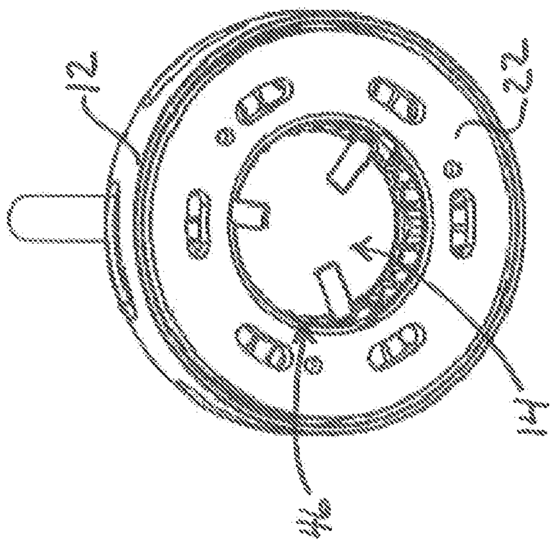
FIG. 10 is a bottom perspective of the portion of the capping chuck assembly.
Figure 13:
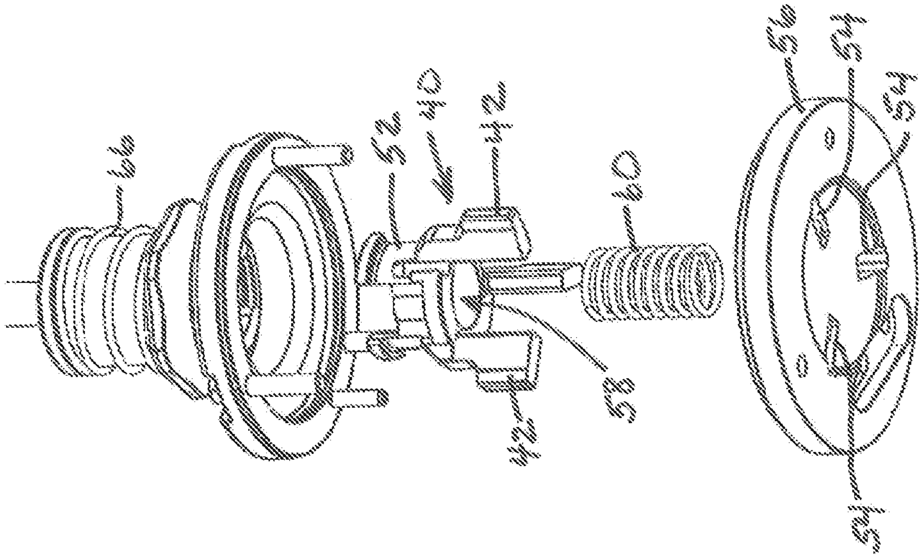
FIG. 13 is an exploded perspective of portions of the capping chuck assembly.
Figure 14:
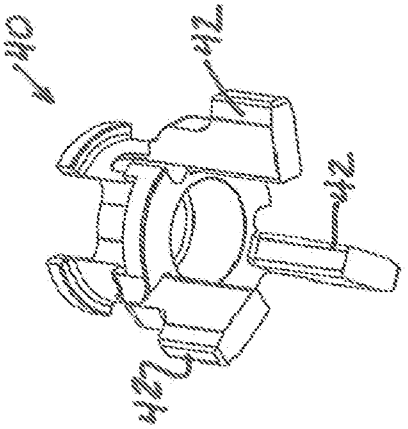
FIGS. 14 and 15 are perspective views of a cap ejector of the capping chuck assembly.
Figure 15:
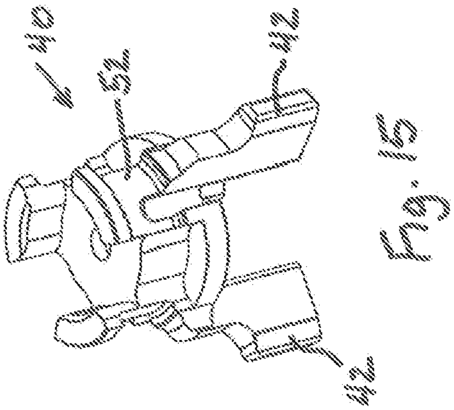
Figure 17:
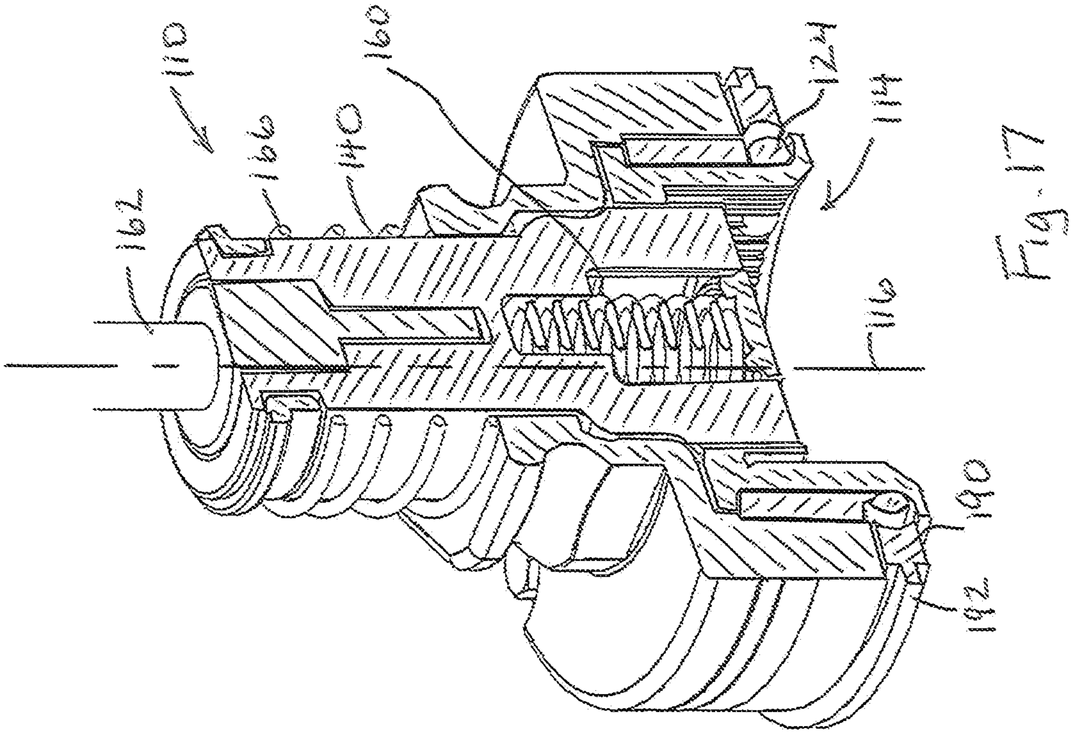
FIG. 17 is a cross-sectional view of the capping chuck assembly of the second embodiment.
Figure 16:
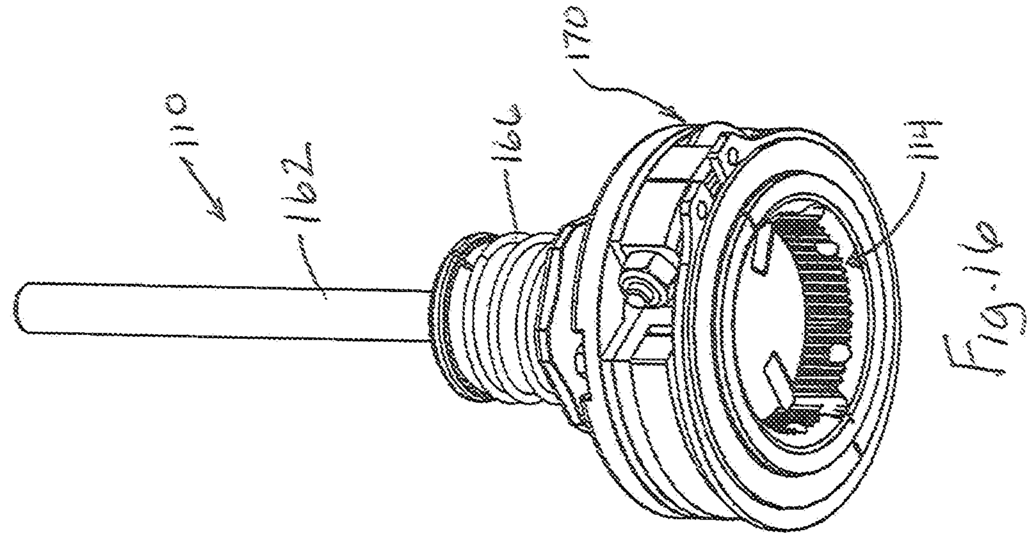
FIG. 16 is a perspective view of a second embodiment of a capping chuck assembly.
Figure 19:
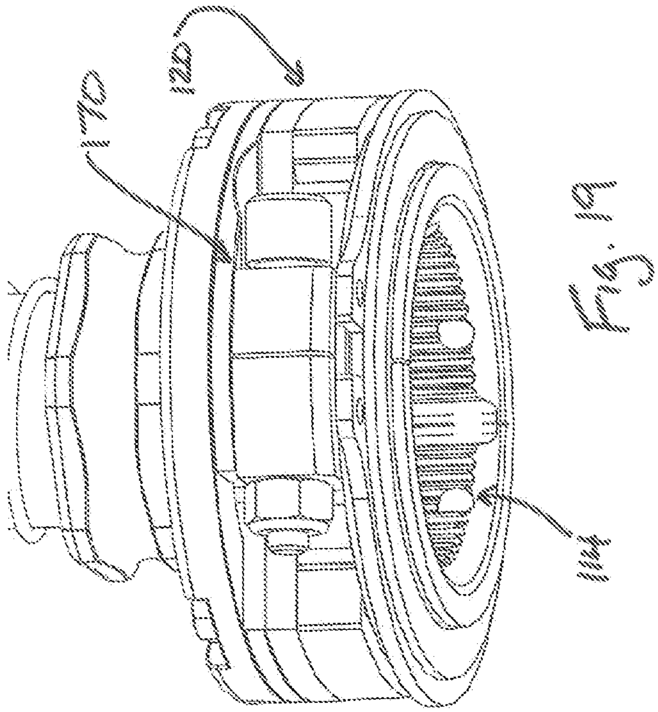
FIGS. 18 and 19 show lower portions of the capping chuck assembly of the second embodiment.
Figure 18:
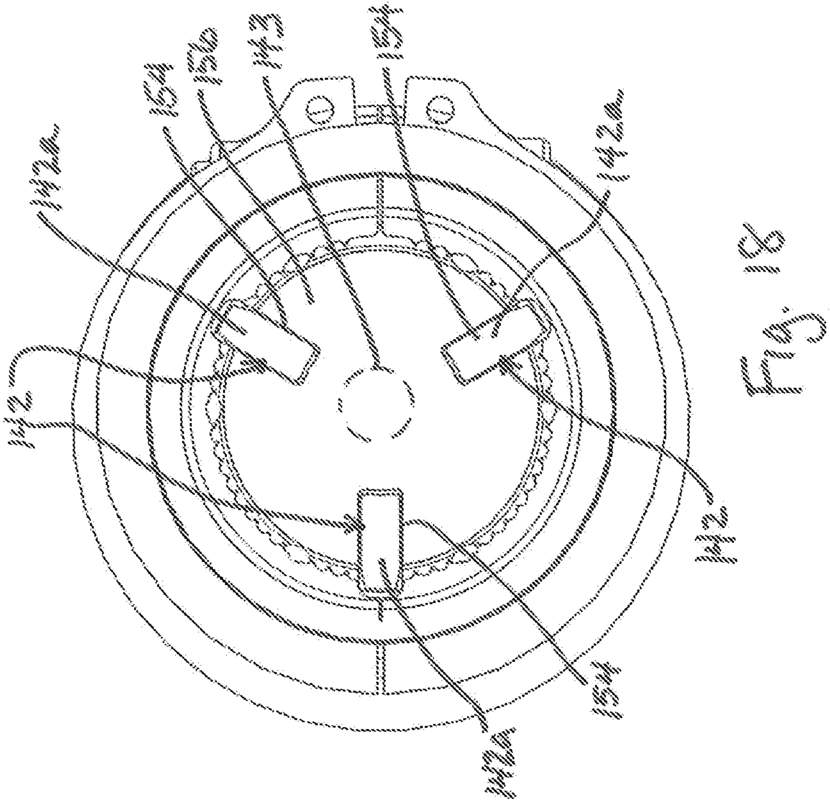
Figure 21:
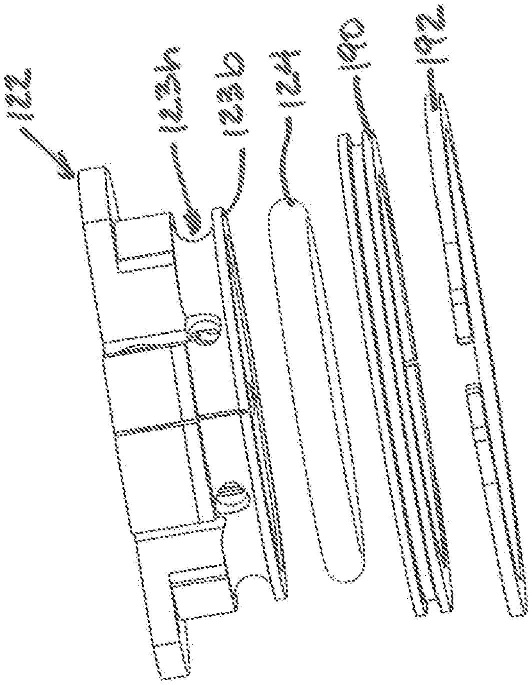
FIG. 20-25 shows portions of a collet assembly of the capping chuck assembly of the second embodiment.
Figure 20:
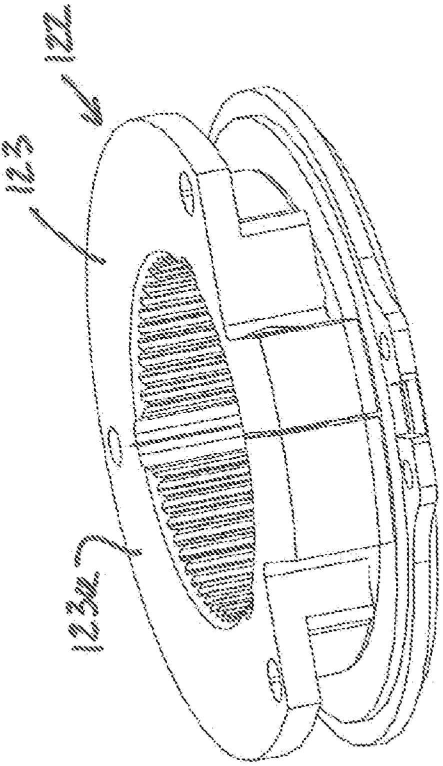
Figure 23:
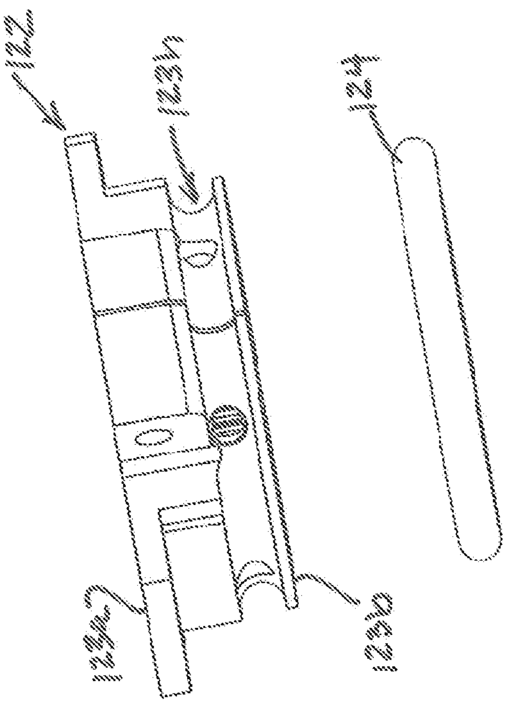
Figure 22:
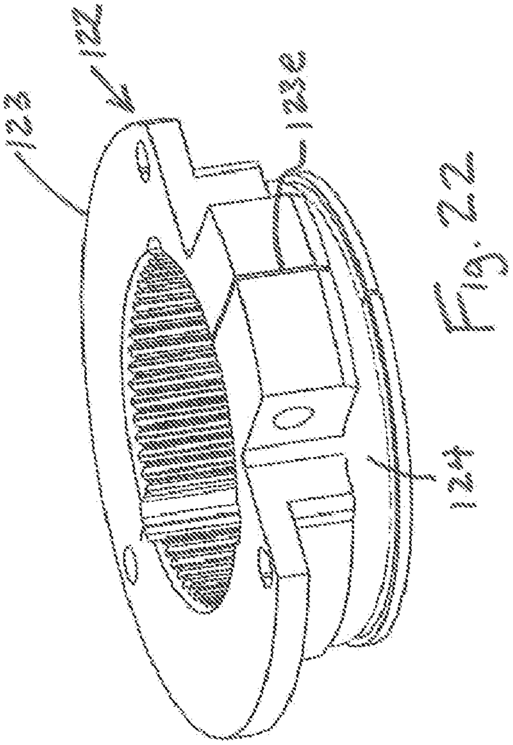
Figure 25:
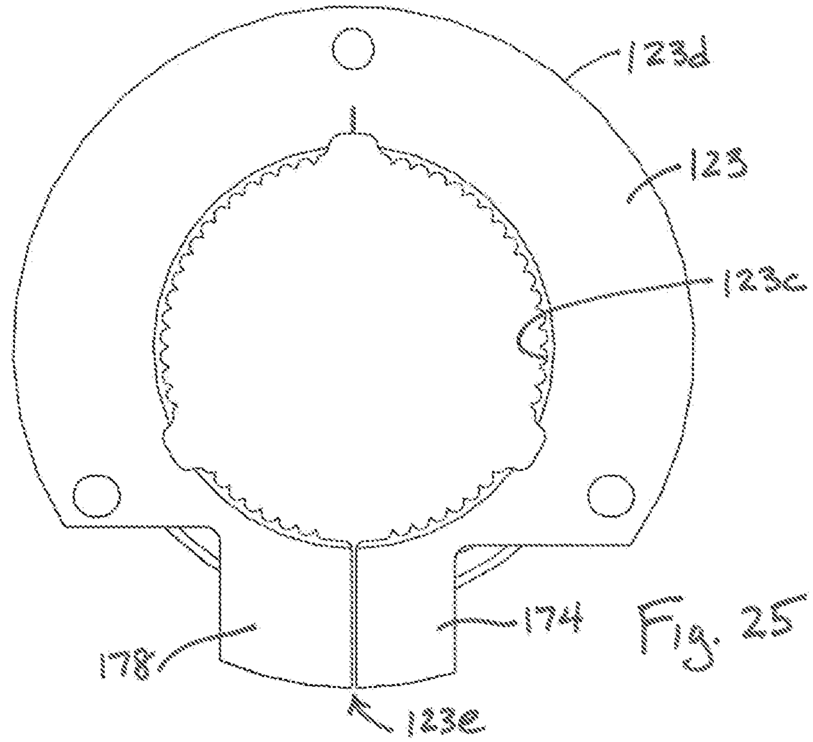
Figure 24:
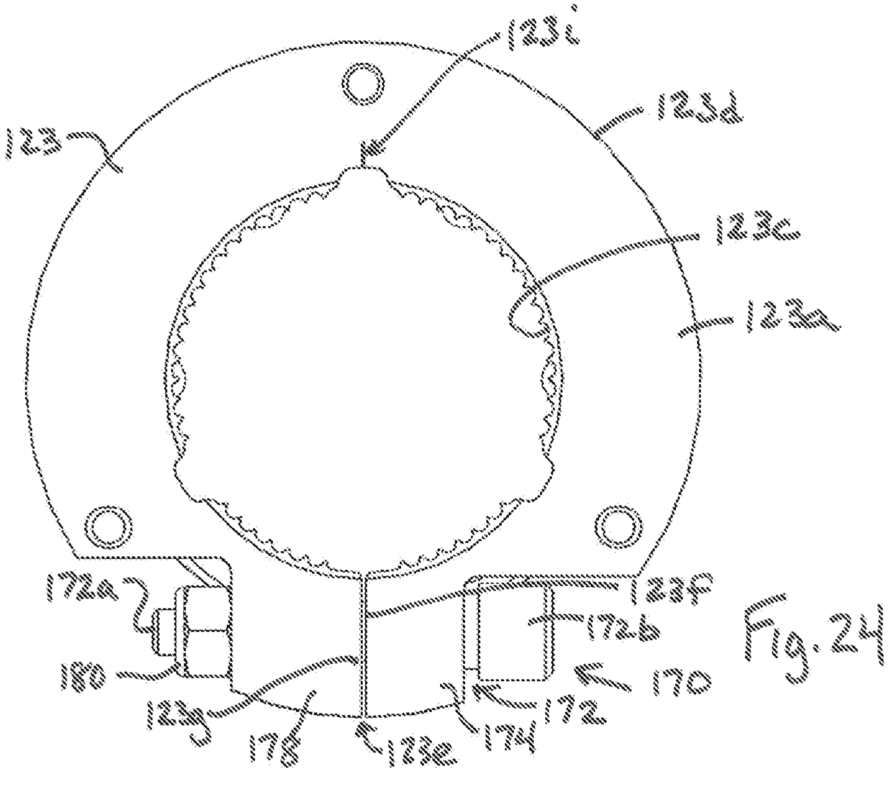
Figure 26:
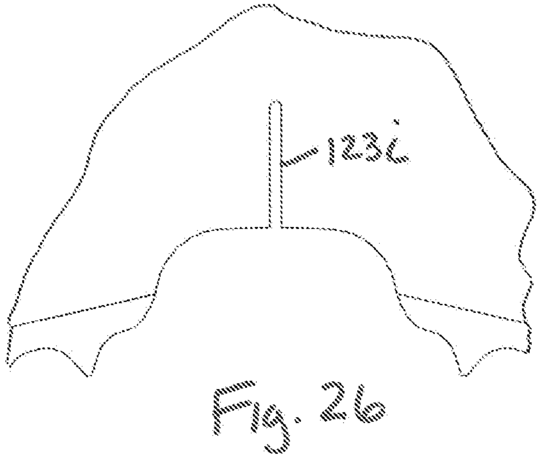
FIG. 26 shows an enlarged view of a relief slot of the collet body.
Figure 27:
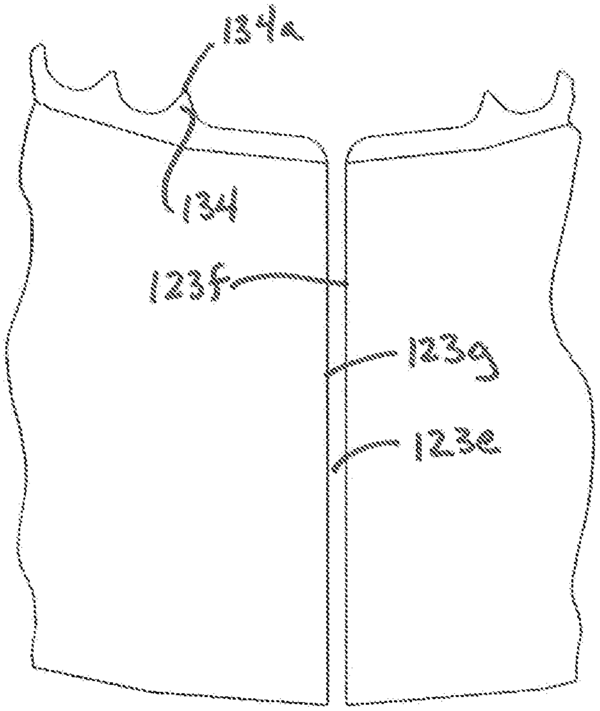
FIG. 27 shows an enlarged view of the gap between ends of the collet body.
Figure 28:
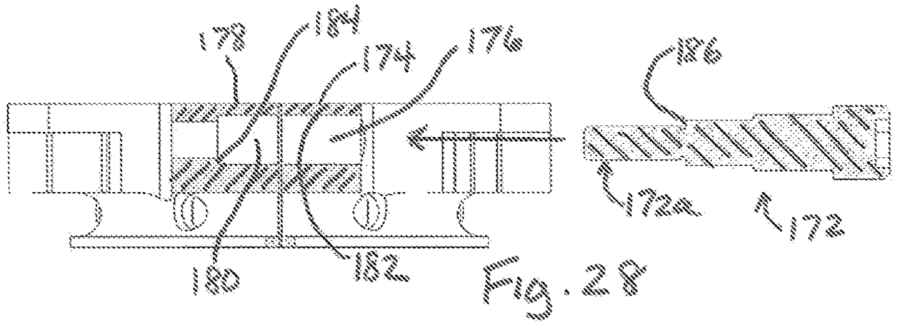
FIGS. 28-30 show cross-sectional views detailing the adjustment assembly of the collet body.
Figure 29:
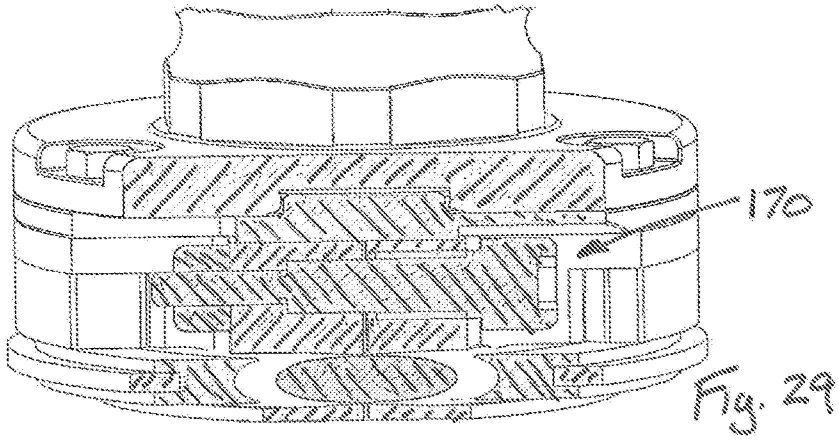
Figure 30:
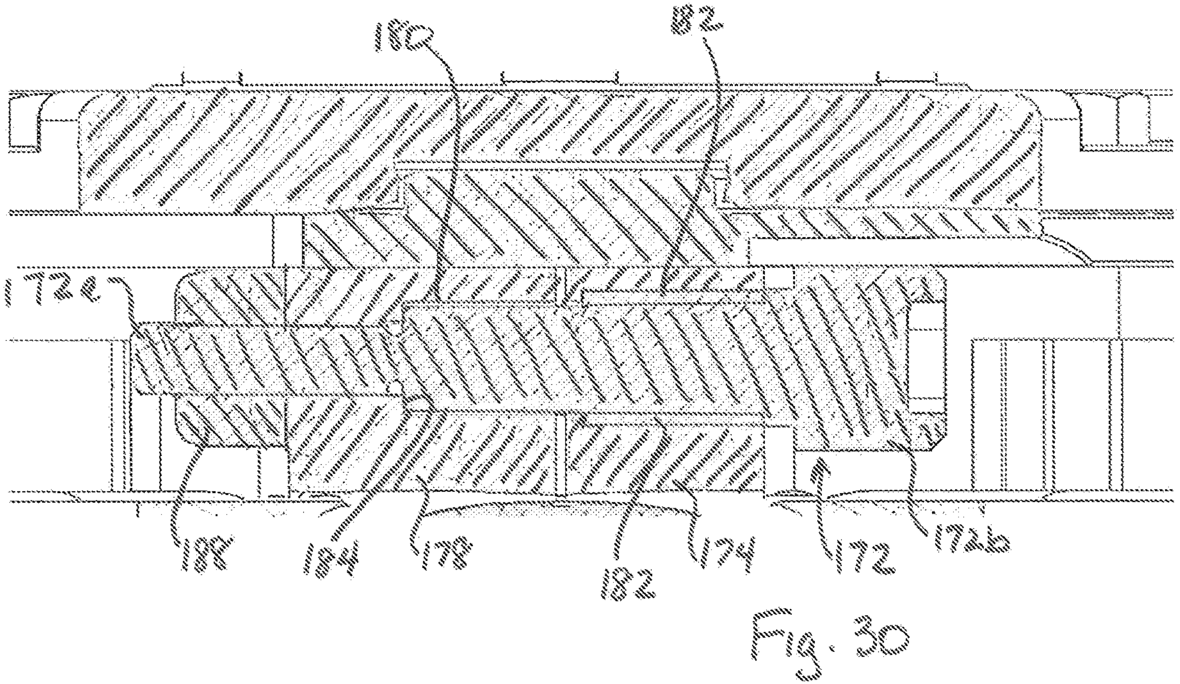

Referring to FIGS. 1-12, a capping chuck assembly 10 includes a chuck housing 12 and a lower cap receiving opening 14. The cap receiving opening has a central axis 16, which is also a rotational axis of the overall assembly. A cap gripper 20 is configured for holding a cap within the cap receiving opening 14. Here, the cap gripper 20 includes multiple gripper elements 22 spaced apart about the central axis 16 and biased inwardly toward the central axis by an o-ring 24 that is positioned around the gripper elements 22 and seated in an outwardly facing groove of each gripper element. The gripper elements 22 are retained within the chuck housing by a lower retaining ring 26, which is secured by fasteners 28 that engage with upward cam projections 30 of the ring. The cam projections are positioned through cam slots 32 of the respective gripper elements 22. The gripper elements 22 define inwardly facing surface portions configured for cap engagement, wherein the inwardly facing surface portions are located at a first radial distance d1 from the central axis 16. Here, the inwardly facing surface portions are defined by the distal ends 34*a* of axially running and inwardly extending rib projections 34, which provide for sound gripping of the external sidewall 36 of a cap 38. However, in other embodiments, the inwardly facing surface portions may be defined by smooth, cylindrical surface portions of the cap gripper.

A cap ejector 40 is axially movable relative to the cap gripper 20 and includes one or more peripheral ejector projections 42 that are axially movable, per arrow 44, between a normal position that is retracted relative to an inlet side 46 of the cap receiving opening 14 and a cap eject position that is shifted toward the inlet side of the cap receiving opening. Each of the one or more ejector projections 42 includes a cap engaging surface portion 42*a* that extends from a location 48 that is radially inward of the first radial distance d1 to a location 50 that is radially outward of the first radial distance. This configuration assures that each of the one or more ejector projections 42 is configured to eject an upside down cap within the cap receiving opening 14 by engaging with a free end 36*a* of the outer sidewall 36 of the upside down cap (e.g., see FIG. 9).

Here, three peripheral ejector projections 42 are provided at respective peripheral locations of the cap receiving opening. Although less than three peripheral ejector projections could be implemented, it has been found that three or more, properly spaced apart from each other about the central axis, helps prevent jamming of the cap during ejection. Here, the cap ejector 40 includes a main body 52, and each of the peripheral ejector projection 42 is integral with the main body, such that axial movement of the main body 52 causes simultaneous axial movement of the peripheral ejector projections 42. Here, the main body 52 is positioned axially outside of the cap receiving opening 14, both when the peripheral ejector projections 42 are in the normal position and when the peripheral ejector projections 42 are in the eject position.

Here, the peripheral ejector projections 42 move through similarly shaped slots 54 in an upper spacing or stop ring 56. The main body 52 of the ejector includes a downwardly facing opening 58 and a spring 60 is positioned within the opening and against the top pf the upper spacing or stop ring 56 to bias the cap ejector away from the cap receiving opening into the normal position. To eject a cap from the cap receiving opening 14, an ejector pin 62 is shifted downward within the chuck assembly 10, which in turn shifts an eject plug 64 downward. The lower end of the eject plug 64 is engaged with the upper end of the cap ejector 40, and thus the cap ejector 40 is also shifted downward. When the ejector pin 62 is subsequently moved back upward, following cap ejection, an outer spring 66 assures that the ejector plug 64 also moves back upward, and the bias provided by the spring 60 assures that the cap ejector 40 moves back upward. However, other variations of assemblies to axially shift the cap ejector between the normal position and the eject position are possible.

For example, referring now to FIGS. 16-30, portions of another chuck assembly 110 are shown in which the cap ejector 140 engages the ejector pin 162 directly (the cap ejector and the ejector plug of the previous embodiment effectively having been combined into a single, unitary/monolithic piece). Here, three peripheral ejector projections 142 are again provided, that move downward through slots 154 in an upper spacing ring 156, and having surface portions 142*a* that are configured to engage with the free end of the sidewall of an upside down cap within the cap receiving opening 114, which has associated central axis 116. Springs 160 and 166 operate similar to springs 60 and 66 described above in connection with the eject operation.

Unlike chuck assembly 10 above, chuck assembly 110 includes a cap gripper 120 that is in the form of a collet assembly with a single collet jaw element 122. In particular, the collet jaw element 122 is in the form of a ring-shaped collet body 123, which here is a unitary, monolithic structure, and extends about a periphery of the cap receiving opening 114. As used herein, the term "ring-shaped" encompasses any structure that extends about an opening therethrough, and does not require any specific cross-sectional shape or a consistent in cross-sectional shape.

The ring-shaped collet body 123 includes an upper side 123*a*, a lower side 123*b*, a radially inner side 123*c* and a radially outer side 123*d*. The ring-shaped collet body 123 has a gap 123*e* extending from the radially inner side 123*c* to the radially outer side 123*d* and from the upper side 123*a* to the lower side 123*b*, to form a full break in the continuity of the ring-shaped collet body 123. The radially inner side 123*c* of the ring-shaped collet body includes inwardly facing surface portions configured for cap engagement. Here, the inwardly facing surface portions are, again, defined by the distal ends 134*a* of axially running and inwardly extending rib projections 134.

Notably, an adjustment assembly 170 is mounted on the ring-shaped collet body 123 for varying a size of the gap 123*e* such that a radial spacing d2 of the inner surface portions from the central axis 116 is adjustable to accommodate cap size variations. In particular, the gap 123*e* defines a spacing between opposed ends 123*f*, 123*g* of the ring-shaped collet body, and the adjustment assembly 170 includes at least one fastener 172 interconnecting the ends 123*f*, 123*g*. End 123*f* includes an outwardly extending collar 174 with a through opening 176, the end 123*g* includes an outwardly extending collar 178 with a through opening 180, and the fastener 172 passes through both of the through openings 176 and 180.

The through opening 176 includes a threaded segment 182, and the fastener 172 includes threads that threadedly engage with the threaded segment 182. The through opening 180 includes an internal shoulder 184 facing the through opening 176, and the fastener 172 includes an external shoulder 186 engageable with the internal shoulder 184 for pushing the outwardly extending collars 174 and 178 away from each other during rotation of the fastener in a first rotational direction. The fastener 172 passes completely through the through opening 180 such that an end part 172*a* of the fastener 172 is located externally of the through opening 180 on a side of the through opening that is opposite the through opening 176. A nut 188 is threadedly engaged on the end part 172*a* and, when the nut is secured against the side of the collar 178, the nut 188 acts to lock the rotational position of the fastener 172. The fastener 172 includes a head end 172*b* that is located externally of the through opening 176 on a side of the through opening 176 that is opposite the through opening 180.

Thus, when the nut 188 is loosened, the fastener 172 can be rotated in the first direction to increase or expand the size of the ring-shaped collet body 123, and can be rotated in a second, opposite direction to reduce or collapse the size of the ring-shaped collet body 123. Once the desired size for a given cap is establishes, the nut 188 can be tightened up against the collar 178. A safety wire may be provided to assure the nut 188 cannot incidentally come completely off of the fastener. A lower portion of the collet body 123 includes an outwardly facing groove 123*h* in which an o-ring 124 is positioned, with the o-ring 124 operating to bias the ring-shaped collet body to reduce the size of the gap 123*e*. An o-ring retainer 190, which also at least partly seats in the outwardly facing groove 123*h*, and an associated snap-ring 192 are provided to hold the o-ring 124 in place. The ring-shaped collet body 123 also includes a relief slot 123*i*, diametrically opposite the gap 123*e*, which extends radially outward from the inner side of the body and part of the way to the outer side, to facilitate the opening and closing of the ring-shaped collet body 123 for the purpose of size adjustment.

The adjustment assembly 170 of the chuck assembly 110 reduces the precision needed in the case of single collect chucks, and also enables a single collet chuck to be adjusted so as to account for manufacturing tolerance variations of the collet and, over time, rib/teeth wear. In one example, the grip diameter of the collet body (defined by the distal ends 134*a* of the ribs/teeth) may be varied by between 5 and 20 thousandths of an inch.

It is to be clearly understood that the above description is intended by way of illustration and example only, is not intended to be taken by way of limitation, and that other changes and modifications are possible.

Figure 31:
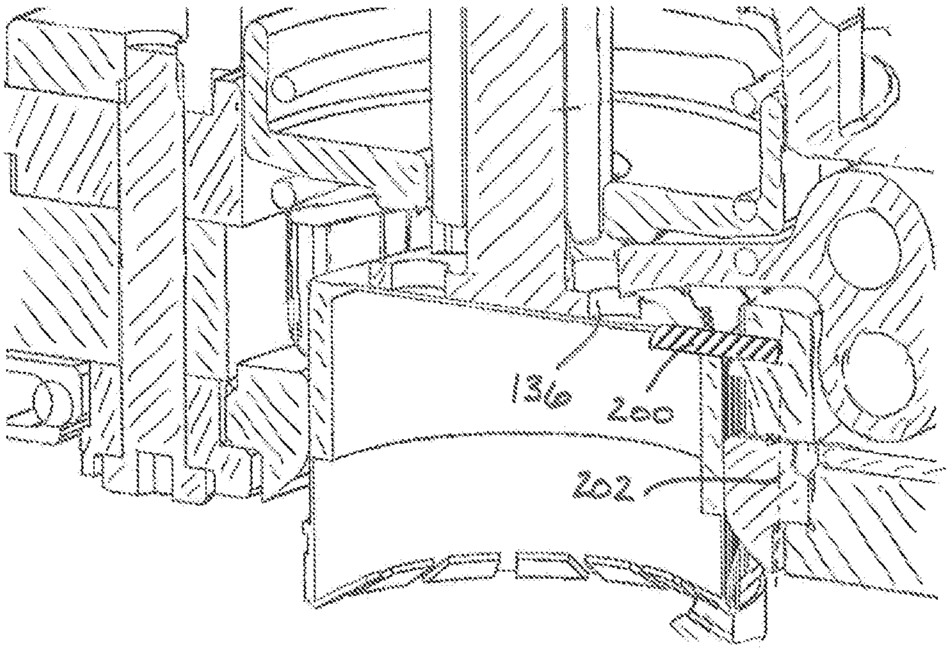
FIG. 31 shows an alternative peripheral ejector configuration.

For example, although the illustrated peripheral ejector projections 42, 142 extend generally radially outward from the central axis of the cap receiving opening, the projections could be offset from radial. Moreover, the number, positioning and shape of the peripheral ejector projections could vary, and/or the peripheral ejector projections could be separate pieces (not molded together as part of a unit or otherwise fixed to each other). Further, the peripheral ejector projections could be used in combination with a central ejector projection (schematically represented by 43 and 143 in FIGS. 11 and 18). Referring to FIG. 31, peripheral ejector projections could be implemented in a capping chuck assembly of the type described in U.S. Pat. No. 11,292,705 by adding outward projections (e.g., 200) that extend from the actuating plate 136 and extend at least slightly into recessed portions (e.g., 202) of the surrounding components).

Figure 32:
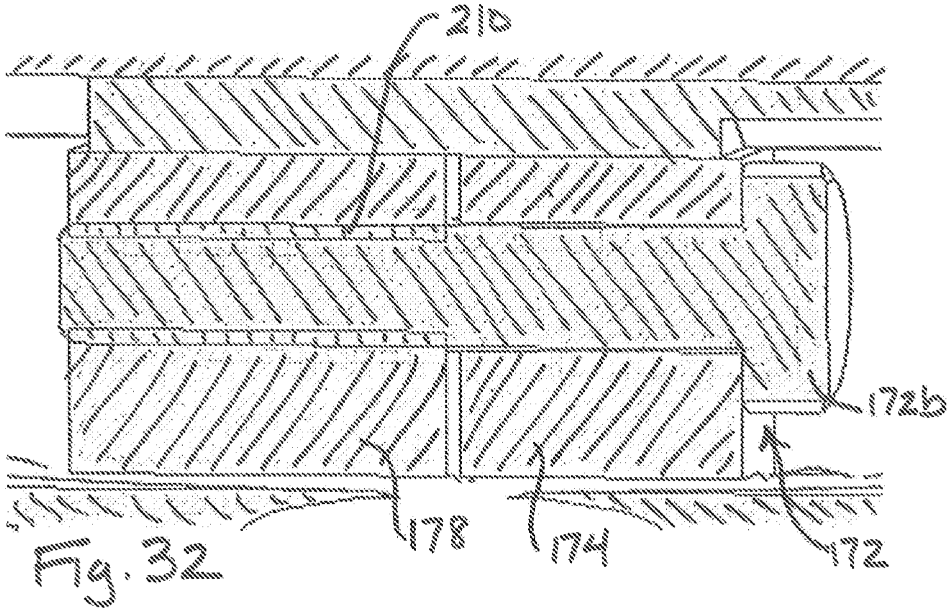
FIGS. 32-34 show alternative adjustment assemblies.
Figure 33:
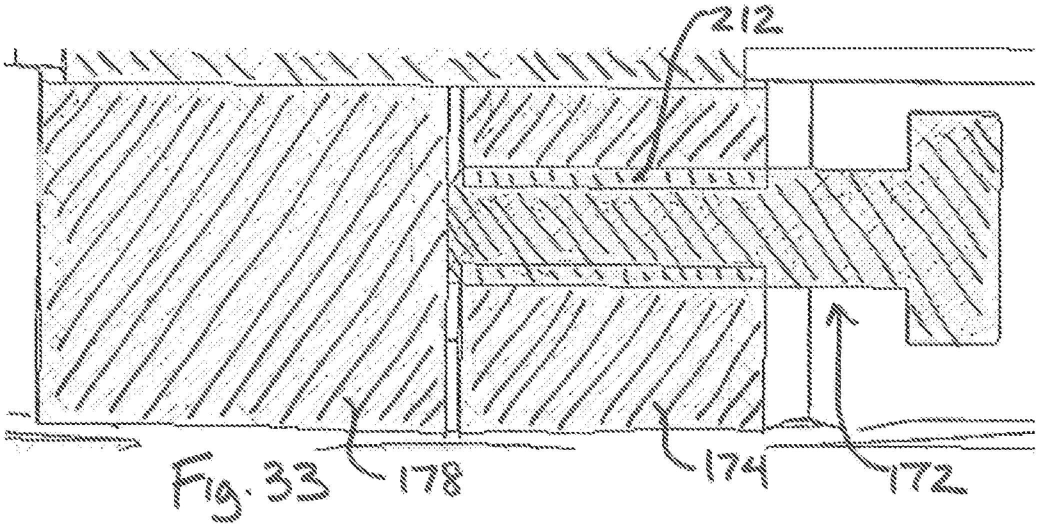
Figure 34:
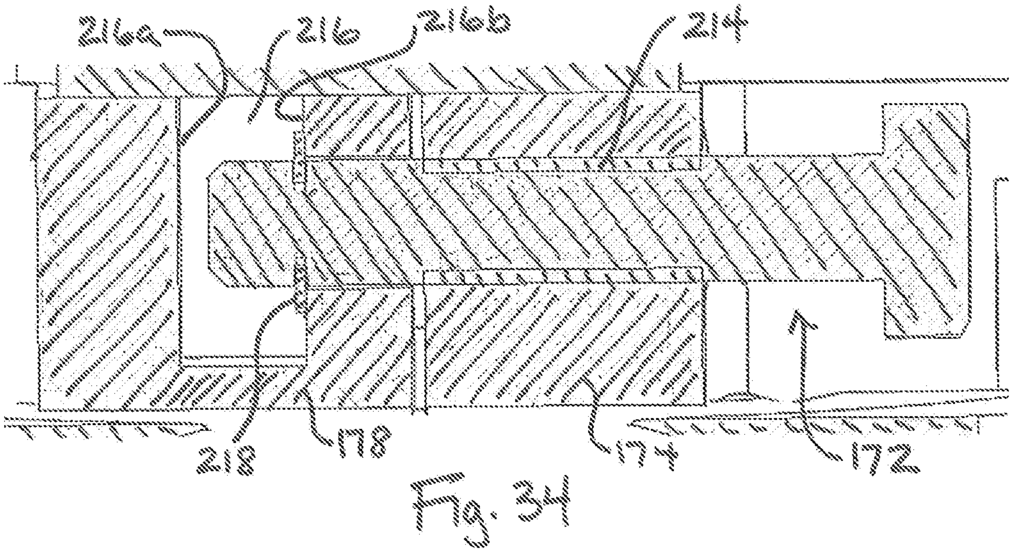

The configuration of the collet adjustment assembly could also vary. For example, FIG. 32 shows an embodiment in which the adjustment assembly is configured such that the fastener 172 threadedly engages with a threaded segment 210 of the collar 178. In this embodiment, the adjustment assembly can only be used to reduce (or collapse) the gripping diameter of the collet body from its originally manufactured size. FIG. 33 shows an embodiment in which the fastener 172 engages with a threaded segment 212 of collar 174 and the distal end 172*a* of the fastener engages the collar 178. In this embodiment, the adjustment assembly can only be used to increase (or expand) the gripping diameter of the collet body from its originally manufactured size. FIG. 34 shows an embodiment in which the fastener 172 engages a threaded segment 214 of the collar 174 and the distal end of the fastener is within a cavity 216 of the collar 178. When the fastener is rotated such that the distal end of the fastener contacts and pushes against the cavity wall 216*a*, enabling the gripping diameter of the collet body to be increased (or expanded) from its original size. Conversely, when the fastener 172 if rotated in the opposite direction such that a snap-ring 218 seated in a recess toward the distal end of the fastener engages with the cavity wall 216*b*, the collars 178 and 174 are pulled toward each other, enabling the gripping diameter of the collet body to be decreased (or collapsed) from its original size.

Still other variations are possible.

The invention claimed is:

1. A capping apparatus for applying caps to containers, comprising:

- a capping chuck assembly including:
  - a cap receiving opening with a central axis;
  - a cap gripper configured for holding a cap within the cap receiving opening, the cap gripper defining inwardly facing surface portions configured for cap engagement, wherein the inwardly facing surface portions are located at a first radial distance from the central axis;
  - a cap ejector axially movable relative to the cap gripper, the cap ejector comprising:
    - one or more peripheral ejector projections movable between a normal position that is retracted relative to an inlet side of the cap receiving opening and a cap eject position that is shifted toward the inlet side of the cap receiving opening, wherein each of the one or more ejector projections includes a cap engaging surface portion that extends from a location radially inward of the first radial distance to a location radially outward of the first radial distance, such that each of the one or more ejector projections is configured to eject an upside down cap within the cap receiving opening by engaging with a free end of an outer sidewall of the upside down cap;
- wherein the one more peripheral ejector projections comprise a first peripheral ejector projection at a first peripheral location of the cap receiving opening and a second peripheral ejector projection at a second peripheral location of the cap receiving opening.

2. The capping apparatus of claim 1, wherein the one or more peripheral ejector projections comprise a third peripheral ejector projection at a third peripheral location of the cap receiving opening.

3. The capping apparatus of claim 1, wherein the cap gripper comprises multiple gripper elements spaced apart about the central axis, each of the gripper elements biased inwardly toward the central axis.

4. A capping apparatus for applying caps to containers, comprising:

- a capping chuck assembly including:
  - a cap receiving opening with a central axis;
  - a cap gripper configured for holding a cap within the cap receiving opening, the cap gripper defining inwardly facing surface portions configured for cap engagement, wherein the inwardly facing surface portions are located at a first radial distance from the central axis;
  - a cap ejector axially movable relative to the cap gripper, the cap ejector comprising:

one or more peripheral ejector projections movable between a normal position that is retracted relative to an inlet side of the cap receiving opening and a cap eject position that is shifted toward the inlet side of the cap receiving opening, wherein each of the one or more ejector projections includes a cap engaging surface portion that extends from a location radially inward of the first radial distance to a location radially outward of the first radial distance, such that each of the one or more ejector projections is configured to eject an upside down cap within the cap receiving opening by engaging with a free end of an outer sidewall of the upside down cap;

wherein the one or more peripheral ejector projections comprise multiple peripheral ejector projections spaced apart from each other about the central axis.

5. The capping apparatus of claim 4, wherein the cap ejector further comprises a main body, and each of peripheral ejector projection is integral with the main body, such that movement of the main body causes simultaneous movement of the peripheral ejector projections.

6. The capping apparatus externally of claim 5, wherein the main body is positioned outside of the cap receiving opening, both when the ejector projections are in the normal position and when the ejector projections are in the eject position.

7. A capping apparatus for applying caps to containers, comprising:

a capping chuck assembly including:

a cap receiving opening with a central axis;

a cap gripper configured for holding a cap within the cap receiving opening, the cap gripper defining inwardly facing surface portions configured for cap engagement, wherein the inwardly facing surface portions are located at a first radial distance from the central axis;

a cap ejector axially movable relative to the cap gripper, the cap ejector comprising:

one or more peripheral ejector projections movable between a normal position that is retracted relative to an inlet side of the cap receiving opening and a cap eject position that is shifted toward the inlet side of the cap receiving opening, wherein each of the one or more ejector projections includes a cap engaging surface portion that extends from a location radially inward of the first radial distance to a location radially outward of the first radial distance, such that each of the one or more ejector projections is configured to eject an upside down cap within the cap receiving opening by engaging with a free end of an outer sidewall of the upside down cap;

wherein all of the inwardly facing surface portions of the cap gripper are defined by a single monolithic collet jaw that includes an adjuster assembly.

8. A capping apparatus for applying caps to containers, comprising:

a capping chuck assembly, comprising:

a cap receiving opening with a central axis;

a cap gripper configured for holding a cap within the cap receiving opening, the cap gripper comprising a collet assembly including:

a ring-shaped collet body extending about a periphery of the cap receiving opening, the ring-shaped collet body includes an upper side, a lower side, a radially inner side and a radially outer side, the ring-shaped collet body having a gap extending from the radially inner side to the radially outer side and from the upper side to the lower side to form a full break in continuity of the ring-shaped collet body, wherein the radially inner side of the ring-shaped collet body includes surface portions configured for cap engagement;

an adjustment assembly mounted on the ring-shaped collet body for varying a size of the gap such that a radial spacing of the inner surface portions from the central axis is adjustable to accommodate cap size variations;

wherein the gap defines a spacing between first and second ends of the ring-shaped collet body.

9. The capping apparatus of claim 8, wherein the adjustment assembly includes at least one fastener interconnecting the first end and the second end.

10. The capping apparatus of claim 9, wherein the first end includes a first outwardly extending collar with a first through opening, the second end includes a second outwardly extending collar with a second through opening, and the fastener passes through the first through opening and the second through opening.

11. The capping apparatus of claim 10, wherein the first through opening includes a threaded segment, wherein the fastener is threadedly engaged with the threaded segment, wherein the second through opening includes an internal shoulder facing the first through opening, wherein the fastener includes an external shoulder engageable with the internal shoulder for pushing the first outwardly extending collar and the second outwardly extending collar away from each other during rotation of the fastener.

12. The capping apparatus of claim 11, wherein the fastener passes completely through the second through opening such that an end part of the fastener is located externally of the second through opening on a side of the second through opening that is opposite the first through opening.

13. The capping apparatus of claim 12, wherein the fastener includes a head end that is located externally of the first through opening on a side of the first through opening that is opposite the second through opening.

14. The capping apparatus of claim 13, wherein the end part of the fastener is threaded and the adjustment assembly further includes a nut threaded on the end part.

* * * * *